Sept. 13, 1960 K. FOWLER ET AL 2,952,387
SYSTEM FOR DETECTING LEAKS IN PIPE LINES AND THE LIKE
Filed Oct. 8, 1958 3 Sheets-Sheet 1

Inventor
Kirk Fowler
Marvin A. Brown
Elmer M. Deters
By McCanna, Morsbach & Pillote
Atty's

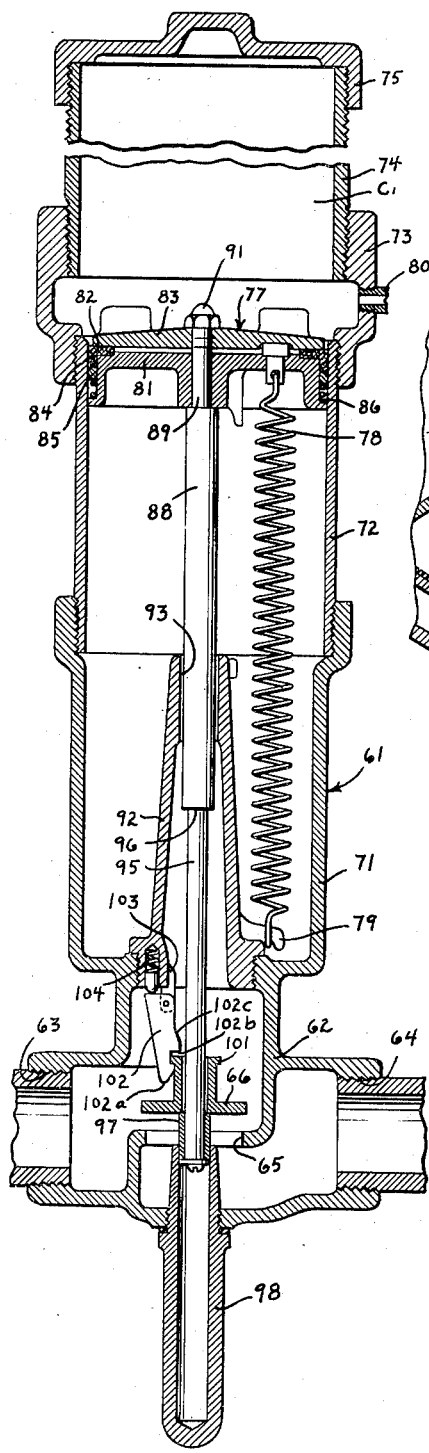
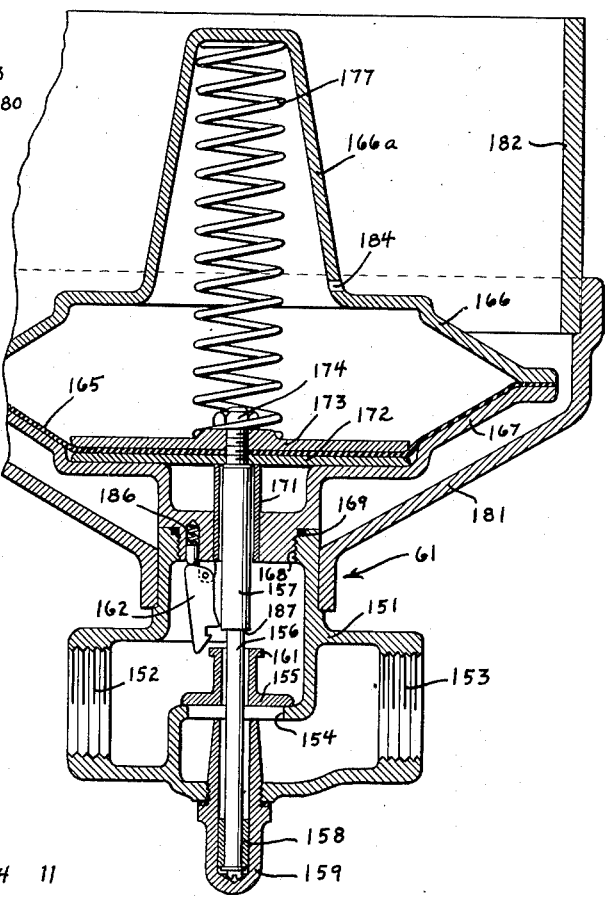

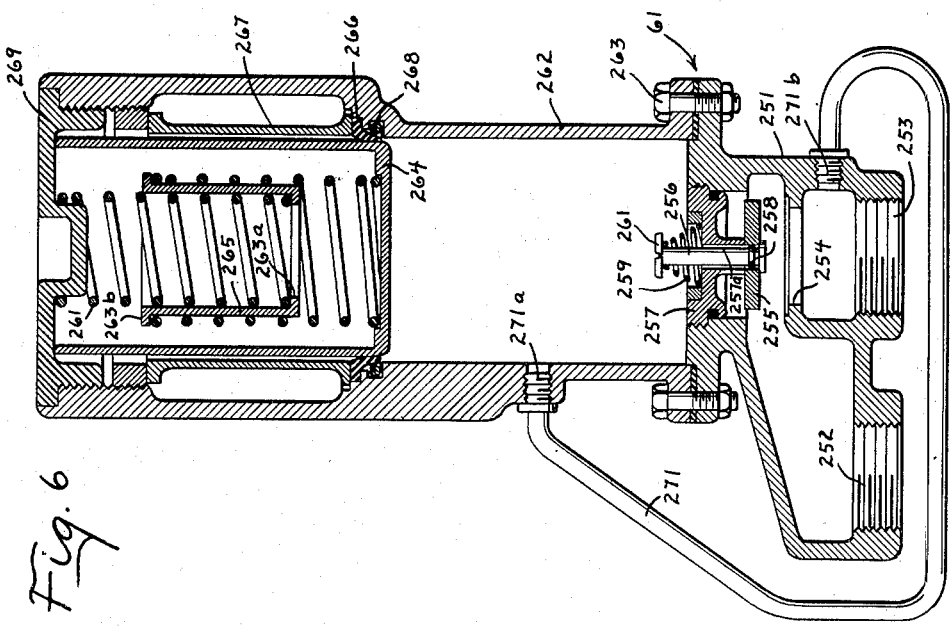
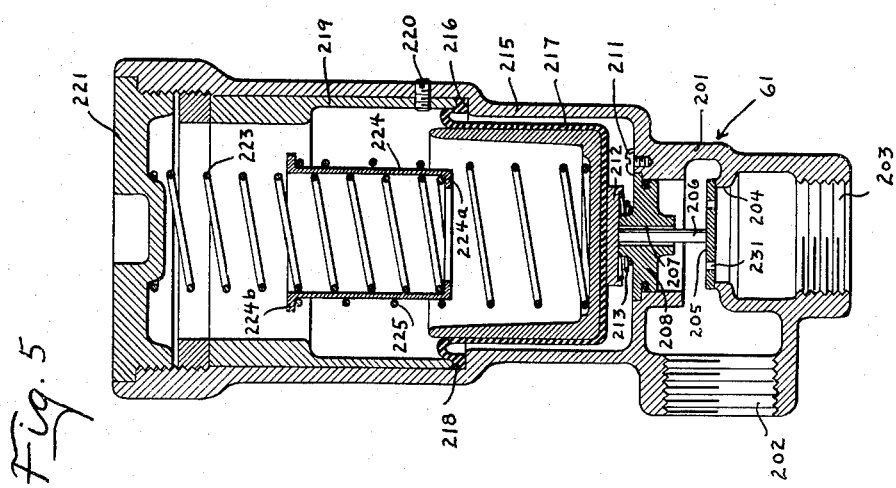

United States Patent Office 2,952,387
Patented Sept. 13, 1960

2,952,387

SYSTEM FOR DETECTING LEAKS IN PIPE LINES AND THE LIKE

Kirk Fowler, Marvin A. Brown, and Elmer M. Deters, Davenport, Iowa, assignors to Red Jacket Manufacturing Co., Davenport, Iowa, a corporation of Iowa Filed Oct. 8, 1958, Ser. No. 766,091

19 Claims. (Cl. 222—52)

This invention relates to a leak detector system and particularly to a system for detecting leaks in a supply line through which fluid is intermittently delivered.

In the dispensing of gasoline at service stations, it has heretofore been the general practice to locate a pump at each pedestal and to draw the gasoline by suction from the underground tank. With this arrangement, there is no safety problem due to leakage of gasoline from the supply line since the pressure in the supply line between the tank and the pedestal is below the surrounding atmospheric pressure and any leakage would be into the system and not out of the same. However, such systems were not entirely satisfactory particularly in the handling of the more highly volatile gasolines which have recently come into use.

It has recently been proposed to locate the pump at the tank for delivering gasoline from the tank to one or more remote pedestals. The gas and the supply line leading from the tank to the pedestal is therefore maintained under pressure so that the more volatile components of the gasoline do not tend to vaporize. However, if there is a leak in the supply line of such a system, the liquid will flow from the supply line into the relatively lower pressure area around the line. When handling explosive and inflammable materials such as gasoline, the accumulations from even a relatively small leak will, over a period of time, produce a very hazardous condition. In those service station installations where the pump is located at the tank and the supply line is maintained under pressure, it is necessary to detect even relatively small leaks from the supply line.

The detection of leaks from the supply line is complicated by the fact that the gasoline is only intermittently pumped through the line and the pressure in the line under normal operating conditions and in the absence of any leak will fluctuate widely from full pump discharge pressure down to zero pressure and sometimes even below atmospheric pressure. Thus, when the pump is started with the discharge valve at the remote pedestal closed, the pressure in the line will build up to substantially full pump discharge pressure. When one or more discharge valves on the associated dispensing pedestals are opened, the pressure will drop somewhat in the line dependent upon the rate of flow from the line. When the pump is stopped, the pressure in the line will also vary dependent upon thermal expansion and contraction of the gasoline therein with changes in temperature.

When handling explosive and inflammable materials such as gasoline, it is not sufficient to merely indicate the presence of the leak by a visual or audible alarm, since such a warning device may be disregarded by the operator for a period of time and permit a dangerous accumulation of gasoline in the area of the leak. On the other hand, complete termination of flow of gasoline in the presence of a leak is not entirely satisfactory either. A leak may occur in the supply line at any time and may be relatively small so that a dangerous condition would arise only if the leak went unattended for a prolonged period. Under such conditions, immediate and complete shut-down of the filling station is unwarranted.

An important object of this invention is to provide a system for detecting leaks in a line through which liquid is intermittently delivered, which system is operative in the presence of a leak to control the delivery of gasoline through the line in such a manner that the operator cannot conveniently disregard the leak for a prolonged period.

Another object of this invention is to provide a system for detecting leaks in a line through which liquid is intermittently delivered, which system is operative in the presence of a leak to delay full flow of liquid from the pump to the delivery outlet for a time interval after the operator attempts to dispense liquid from the line and to thereafter automatically re-establish full flow through the line.

Still another object of this invention is to provide an apparatus for detecting a leak in a line by detecting a change in the volume of liquid in the line and for indicating a leak when the change in volume exceeds the normal volume change incident to thermal contraction of the liquid with changes in ambient temperature.

These, together with various ancillary objects and advantages of this invention will be more readily appreciated as the same becomes better understood by reference to the following detailed description when taken in connection with the accompanying drawings wherein:

Fig. 3 is an enlarged vertical sectional view through a leak detector device employed in the system of Figure 1 and illustrating the parts in their position during the normal pumping operation;

Fig. 4 is a fragmentary enlarged vertical sectional view through a modified form of leak detector and illustrating the parts in their position after the preselected volume of liquid has leaked from the line;

Fig. 5 is an enlarged fragmentary vertical sectional view through a further modified form of leak detector device for use in the leak detector system of Figure 1 and illustrating the parts in their position after the preselected quantity of liquid has leaked from the line; and Fig. 6 is a vertical sectional view through another modified form of leak detector device.

Figure 1:
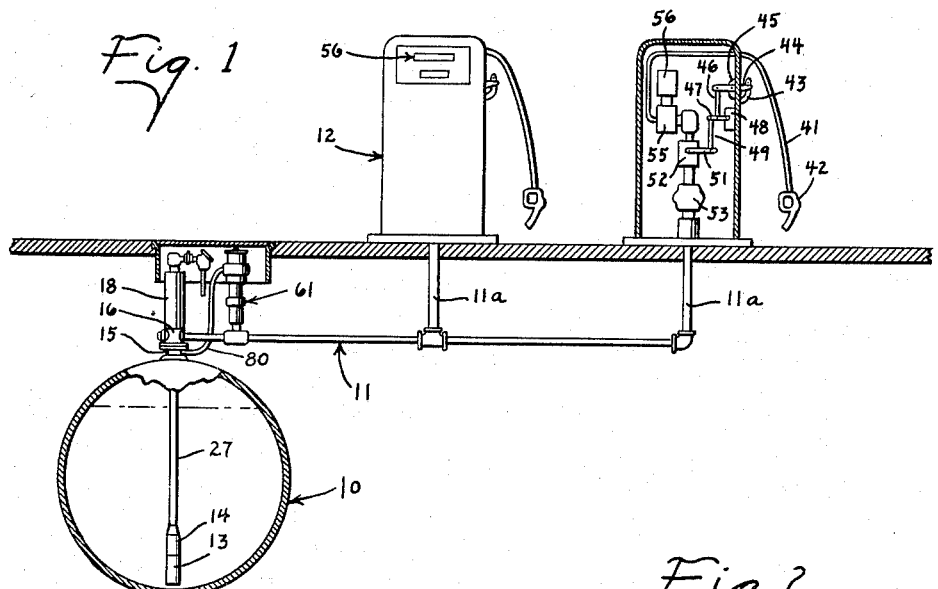
Figure 1 is a diagrammatic view of a service station installation having the leak detecting system of the present invention applied thereto.

As previously described, the present invention is adapted for detecting leaks in a supply line through which liquid is intermittently pumped and is herein shown applied to a gasoline service station installation. Such an installation is diagrammatically shown in Figure 1 and includes an underground tank 10 for storing a quantity of gasoline and a supply line 11 for delivering gasoline from the tank to one or more pedestals 12. A pump and motor 13, 14 herein shown of the submersible type, is provided in the tank for pumping gasoline from the tank through the supply line 11 to the pedestals. The outlet of the pump may be connected to the supply line in any desired manner. One suitable arrangement is illustrated and includes a flanged fitting 15 on the upper end of the tank, a discharge head 16 mounted on the fitting and sealed thereto by a gasket 17, and an extension 18 attached to the discharge head and extending upwardly therefrom. The discharge head 16 has a lateral outlet 19 connected to the supply line 11. An adapter unit or thimble 21 is disposed in the discharge head and sealed thereto by spaced openings 22 and 23 to define an annular chamber 25 in the discharge head. The thimble has a downwardly facing opening 26 which is connected to the delivery pipe 27 leading from the pump 13, and a lateral passage 28 is formed in the adapter unit to permit liquid to flow from the downwardly facing opening to the annular chamber 25 in the discharge head. A check valve is provided to prevent return flow of liquid from the supply line and includes a member 31 defining an annular valve seat and a valve member 32 cooperable with the seat. The valve member is mounted by a spider 33 and a pin 34 on the adapter unit and is yieldably urged by a spring 35 to a position blocking flow through the port 28. As is apparent, the check valve 32 is arranged to open and permit flow from the delivery pipe 27 through the port 28 and chamber 25 to the supply line 11, and to close to prevent return flow. A drop pipe 36 is connected to the adapter unit and extends upwardly through the extension 18 to permit withdrawal of the adapter unit, pump and motor from the tank. The power for the motor is supplied through conductors 37 which extend through the adapter unit downwardly into the tank.

A valve mechanism is also provided at the pedestal 12 and so arranged as to be closed when the pump is stopped to thereby entrap the liquid in the supply line 11 between the tank check valve 32 and the valve mechanism at the pedestal.

As herein shown, the supply line 11 at each of the pedestals is connected to a delivery hose 41 having a conventional normally-closed discharge valve at the outlet end thereof, and which discharge valve is manually operable to its open position to permit dispensing of gasoline therefrom. The pedestal 12 also includes a conventional nozzle support 43 and a switch lever 44 which extends over the nozzle support and is pivotally mounted by a bracket 45 on the pedestal. The switch lever is connected through a link 46 to the operating lever 47 of the pump control switch 48, and is also connected through a link 49 to the operating lever 51 of an interlock valve 52. The interlock valve is of conventional construction and is disposed in the supply line leading to the hose 41 and is normally closed, the interlock valve being opened in response to movement of the switch lever 44 to a position to close the pump control switch 48. A check valve 53 is also disposed in the supply line, either before or after the interlock valve, and a meter 55 controlling a register 56 is provided in the supply line for measuring the quantity of liquid passing therethrough.

When the discharge valve 42 is closed to stop the dispensing of liquid, the check valve 53 at the pedestal also closes. The pump continues to operate and delivers liquid to the line until the pressure in the line builds up to maximum delivery pressure, that is full pump discharge pressure less any loss in head due to the difference in elevation between the pump and the supply line. The check valve 32 at the tank then closes to prevent return flow and maintain pressure in the line. The discharge valve 42 on the hose is thereafter hung on the support 43 and operates the lever 44 to close the interlock valve and open switch 48 to stop the pump.

The supply line is thus effectively isolated from the remainder of the system when the pump is stopped, and provision is made for detecting a leak in this portion of the supply line between the valves at the pedestal and the valve at the tank by measuring the loss in volume of liquid in the line. The leak detecting apparatus 61 of the present invention is preferably located in the supply line 11 ahead of the connection of the pedestals 12 thereto, so that a single leak detector may be employed in such a pumping installation independent of the number of pedestals associated with each pump. Alternatively, a separate leak detector may be disposed in the branch line 11a leading to each pedestal.

The leak detector 61 is arranged to interrupt the flow of gasoline through the line 11, when a leak is detected, and to delay the re-establishment of full flow through the supply line for a time interval after the operator attempts to deliver gasoline. This impedes the dispensing of gasoline when a leak exists in the system without requiring an immediate and complete shutdown of the station. As shown in Fig. 3, the leak detector 61 includes a body 62 having an inlet 63 and an outlet 64 arranged for connection in the supply line 11 so that, in the normal dispensing operation, gasoline flows from the pump through the inlet 63 and out through the outlet 64. A transverse partition is provided in the housing and defines a port 65 intermediate the inlet and outlet and a flow control member 66 is provided for controlling the flow through the port 65.

A measuring cylinder communicates with the supply line 11 and is arranged to receive a charge of liquid therefrom, when the pump 13 is operated, and to deliver the liquid back to the line in accordance with the change in volume therein, when the pump is stopped. The change in the volume of liquid in the line 11, for any given change in ambient temperature, can be accurately determined and is a function of the volume of liquid stored in the line between the check valve at the tank and the valve means at the pedestals. The measuring cylinder is arranged to store a quantity of liquid in excess of the thermal contraction of the liquid in the line 11, with normal ambient temperature variation, and provision is made for operating the flow control means 66 to interrupt flow through the line when the change in the liquid volume in the supply line, when the pump is stopped, exceeds that due to thermal contraction of liquid in the line.

More particularly, the housing 62 has a cylindrical portion 71 formed thereon and extending upwardly therefrom, and a cylinder 72 threaded into the upper end of the cylindrical portion. A fitting 73 is threadedly connected to the upper end of the cylinder and has an extension 74 connected thereto and extending upwardly to the ground level. A cap 75 is removably attached to the upper end of the extension. A movable wall, herein shown in the form of a piston 77, is disposed in the cylinder 72 and a spring 78 is attached to the piston and to a hook 79 carried by the housing to yieldably urge the piston in a direction to force the liquid outwardly therefrom. When the pump is operated, the pressure in the supply line varies from normal delivery pressure, that is the pressure the pump will maintain in the line when all delivery valves are open, to maximum delivery pressure when the delivery valves are closed. In order to prevent spurious operation of the detector during the normal dispensing cycle, the spring 78 is selected so that the piston 77 will move to its raised position when the pressure in the line reaches a value which is less than normal delivery pressure.

Figure 2:
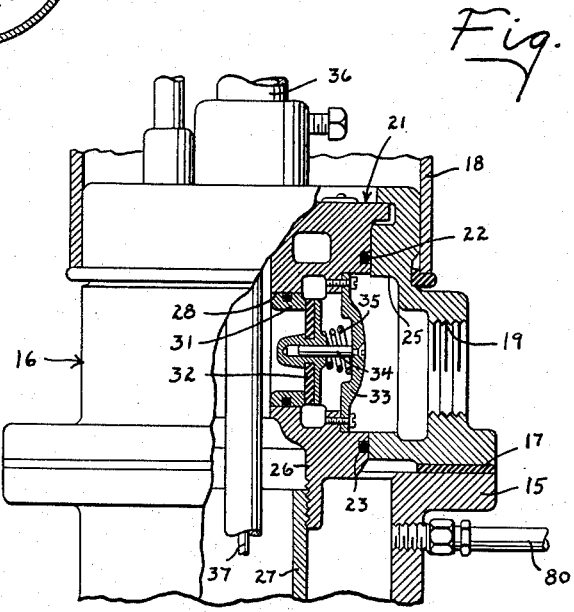
Fig. 2 is an enlarged view of the discharge unit, with parts broken away and shown in section to illustrate details of construction.

The piston 77 includes a flanged head 81 having a packing ring 82 clamped to the head by a retainer plate 83. The packing ring has a skirt portion 84 which engages the wall of the cylinder 72 and an expander ring 85 is slidably disposed on the flange portion of the piston and is yieldably urged by a spring 86 in a direction to cam the skirt portion 84 of the packing ring outwardly into snug sealing engagement with the cylinder. The chamber C, above the piston is preferably vented, and as shown in Figs. 1 and 2, a vent tube 80 communicates at one end with this chamber and at the other end with the interior of the storage tank 10 through a coupling 80a in the flanged fitting 15 on top of the tank.

A stem 88 has a reduced diameter upper end portion 89 defining a shoulder therebetween which underlies the head 81 and a nut 91 is threaded on the end of the stem to clamp the retainer plate 83 to the head. A tubular guide member is threadedly connected to the housing 62 and extends upwardly into the cylindrical portion 71 to define a guide bore 93 which loosely and guidably receives the stem 88. The chamber at the underside of the piston 77 is communicated with the supply line 11 and conveniently the guide bore 93 may be dimensioned so as to provide a restricted flow of liquid therethrough around the stem 88. When the pump is operated, the liquid will flow from the supply line 11 through the passage between the stem and guide bore 93 and into the measuring chamber to move the piston upwardly against the bias of the spring 78. For reasons set forth hereinafter, the passage around the stem 88 is restricted so that the piston will move upward relatively slowly during the operation of the pump.

The stem 88 has a reduced diameter lower portion 95 defining a downwardly facing shoulder 96 on the stem. The stem has a lost motion connection with the flow control member 66 and, as herein shown, the flow control member is slidably disposed on the extension 95 and a stop formed by a sleeve 97 attached to the lower end of the extension 95, is arranged to engage the flow control member or valve 66 when the piston is raised to thereby open the valve. A tubular guide member 98, closed at the lower end, is threaded into the housing 62 and guidably receives the lower end of the piston rod 88.

The flow control member 66 has a peripheral flange 101 on the upper end thereof and a latch 102 is pivotally mounted on an ear 103 carried by the housing 62. The latch has a cam nose 102a at the lower end thereof arranged to cam the latch outwardly as the flow control member is raised, and a seat 102b arranged to receive the flange 101 and releasably retain the same in its raised position. The latch is yieldably urged into its latched position by means of a spring 104.

The flow control member 66 will remain in its open position shown in Fig. 3 when the volume of the liquid in the supply line 11 decreases and the piston 77 lowers in the cylinder 72, until the downwardly facing shoulder 96 engages a cam face 102c on the latch member 102. This swings the latch member outwardly and releases the flow control member which then drops, by gravity, to a position blocking flow through the port 65. The shoulder 96 is positioned on the valve stem so that it engages the cam face 102c only after a preselected volume of liquid has passed out of the measuring chamber, which volume exceeds the normal contraction in the supply line 11 to thereby indicate a leak in the line.

The flow control member 66 is preferably arranged so that it does not form a tight seal with the stem 95 to permit a restricted flow of liquid thereby. However, this flow is small as compared to the normal delivery rate through the line and prohibits filling of a vehicle gas tank within any reasonable period of time. After the pump has been in operation for a period of time, the liquid flowing through the restricted passage 93 around the stem 88 will gradually move the piston 77 upwardly until the lower stop 97 engages the valve member 66 and moves the same to its opened position. The restrictive flow passage defined between the guide passage 93 and the stem 88 delays the reopening of the flow control valve for a time interval after the operator attempts to dispense gasoline from the pump and thereby impedes normal delivery of gasoline sufficient to induce the operator to have the leak corrected, without requiring immediate and complete shut-down of the station.

The leak detecting apparatus 61 illustrated in Fig. 4 is similar to that shown in Fig. 3 and includes a housing 151 having an inlet and an outlet 152 and 153 adapted for connection in the supply line and a port 154 between the inlet and outlet. A flow control member 155 is provided for controlling the flow through the port and is loosely and slidably received on the lower end portion 156 of the stem 157. The lower end of the stem has a bushing 158 thereon which is guidably received in a sleeve 159 attached to the housing and the flow control member has a flange 161 adapted to be engaged by a latch member 162.

In the arrangement shown in Fig. 4, a diaphragm type movable wall is employed as contrasted to the piston illustrated in Fig. 3. The diaphragm 165 is clamped at the periphery thereof between upper and lower members 166 and 167. The lower member 167 has a fitting 168 thereon which is threadedly attached to the upper end of the housing 151 and sealed thereto by an O-ring 169. A bushing 171 is disposed in the fitting and guidably receives the rod 157. Reinforcing plates 172 and 173 are applied to opposite sides of the central portion of the diaphragm and clamped together and to the stem by means of a nut 174 threaded on the end of the stem. The upper member 166 has an extension 166a for receiving a spring 177, and which spring yieldably urges the diaphragm to its lowered position shown in Fig. 4. As in the preceding embodiment, the spring 177 is arranged to yield and permit the diaphragm to move upwardly when the pump is operated and the pressure on the diaphragm reaches a value below the normal operating pressure in the line. As is apparent, the upper and lower members 166 and 167 are contoured so as to receive the reinforcing plates 172 and 173 and to support the diaphragm in either distended position thereof.

The diaphragm housing is preferably enclosed in an underground casing including the outwardly flared member 181 attached to the valve housing 151 and the extension sleeve 182 which extends upwardly from the member 181 to a point adjacent the ground level. The chamber above the diaphragm 165 is vented to atmosphere through a port 184 in the upper member 166 and the lower chamber below the diaphragm 165 is communicated with the supply line 11. Conveniently, the clearance between the bushing 171 and the rod 157 may be made sufficient to permit a restricted flow of fluid between the supply line and the chamber at the other side of the diaphragm and slowly move the same upwardly against the bias of the spring 177. As in the preceding embodiment, the latch member is cammed outwardly and engages the flange 161 on the flow control member to yieldably retain the same in its raised position. A spring 186 is provided for retaining the latch member in its latch position and a shoulder 187 is formed on the stem to release the same when the volume of liquid displaced from the measuring chamber exceeds that which would be due to only thermal contraction in the line 11.

The leak detector 61 shown in Fig. 5 also includes a valve casing 201 having an inlet 202 and an outlet 203 adapted for connection in the supply line 11. A port 204 is formed in the casing intermediate the inlet and outlet and a flow control member 205 is mounted for movement into and out of position overlying the port to control flow therethrough. In particular, the flow control member includes a stem 206 which is guidably received in a bore 207 in a guide member 208. The guide member 208 is removably seated in an opening 209 in the valve casing and is retained therein by fasteners 211. A head 212 is provided on the upper end of the stem 206 and a spring 213 is interposed between the head and the guide 208 to yieldably urge the flow control member to its raised position uncovering the port 204.

The valve casing 201 has an upstanding sleeve 215 herein shown formed integrally therewith, which sleeve has an inwardly extending shoulder 216 intermediate the ends thereof. A cup shaped diaphragm 217 is disposed in the sleeve and has a peripheral flange 218 adapted to rest on the shoulder 216. A retainer 219 is disposed in the sleeve and clamps the flange on the diaphragm against the shoulder 216. The upper end of the sleeve is closed as by a cover plate 221. As in the embodiment of Fig. 3, the chamber above the diaphragm is vented through a port 220, either directly to atmosphere or to the storage tank 10.

A cup shaped diaphragm reinforcing member is disposed within the sleeve 215 and engages the diaphragm, and a spring arrangement is provided for yieldably urging the diaphragm downwardly into engagement with the head on the valve stem 206. As disclosed herein, a pair of telescopically arranged springs are provided, the first spring 223 being interposed between the cover 221 and the inwardly extending flange 224a on the lower end of the spring guide 224, and the second spring 225 being interposed between the outwardly extending flange 224b on the upper end of the spring guide and the diaphragm reinforcing member.

The chamber below the diaphragm 217 is communicated with the supply line and, as in the preceding embodiments, sufficient clearance is provided between the walls of the passage 207 and the stem 206 to permit restricted flow of fluid from the supply line into the chamber, when the pump is operated. As the diaphragm moves upwardly, it disengages the head 212. In its uppermost position, the diaphragm reinforcing member engages the underside of the cover 221 to limit further upward movement of the diaphragm.

At the completion of the pumping operation, the diaphragm 217 is in its raised position. When the pump is stopped, the diaphragm will move downwardly as the volume of the liquid in the supply line 11 decreases. If the change in volume is only due to thermal contraction, the diaphragm will not move downwardly a distance sufficient to engage the head 212 on the valve member to close the same. However, if a leak occurs in the line, sufficient liquid will pass from the chamber to permit the diaphragm to move downwardly under the bias of springs 223 and 225 to close the flow control member 205.

When the operator thereafter starts the pump 13 to dispense liquid, full flow will not be established through the supply line since the control valve 205 is closed. However, gasoline will flow through the passage 207 around the stem 206 and gradually move the diaphragm upwardly against the bias of springs 223 and 225. When the diaphragm disengages the head 212, the spring 213 tends to move the flow control member to its raised position. However, the valve member cannot move upwardly to its open position until the pressure unbalance on opposite sides thereof is substantially equalized. Thus, at the beginning of the pumping cycle, substantially full discharge pressure is applied to the upper side of the valve member while the lower side is exposed to relative low pressure due to previous leakage of liquid from the line. If the valves at the dispensers are maintained closed, a restrictive flow of liquid will pass through the openings 231 in the flow control member sufficient to equalize the pressures in the line at opposite sides of the valve member, after a period of operation of the pump. At that time, the spring 213 will be effective to open the valve member and permit dispensing from the pump. However, if the operator holds the delivery valve open and continuously drains whatever liquid there is in the line, it is apparent that the pressure at the underside of the valve member will remain relatively low so that the valve member cannot open.

In the modified arrangement illustrated in Fig. 6, the flow control member 61 includes a casing 251 having an inlet 252, an outlet 253, and a port 254 intermediate the inlet and outlet. A valve member 255 controls flow through the port and is mounted on a stem 256 guidably supported on a guide member 257 for movement toward and away from the port 254. In this embodiment, the valve member 255 is imperforate and is sealed to the stem, as by an O-ring 258. A spring 259 is interposed between the guide 257 and a head 261 on the stem to yieldably urge the valve member to its raised position.

A measuring chamber is provided at the upper side of the casing 251 and includes a sleeve 262 which is secured, as by fasteners 263, to the upper side of the casing 251. A piston 264 is slidably received in the casing and is sealed thereto as by a packing ring 265. As herein shown, the periphery of the packing ring is supported on a shoulder 266 and is clamped to the shoulder by a ring member 267. An annular spring 268 surrounds the sealing ring and yieldably urges the same into engagement with the piston. A cover 269 overlies the upper end of the sleeve and telescoping springs 261 and 262 are provided for urging the piston to its lowered position. As in the preceding embodiment, the spring 261 engages an inwardly extending flange 263a on the lower end of a spring guide 263 and the spring 262 engages an outwardly extending flange 263b on the upper end of the spring guide. As in the preceding embodiments, the volume displaced by the movable wall 264 is made greater than the thermal contraction of the liquid in the supply line 11 with normal changes in ambient temperature so that the piston does not engage the head on the valve stem to close the valve unless there is a leak in the line. When the valve member 255 is closed by the piston 264, it will be held in its closed position by the fluid pressure unbalance on opposite sides thereof. In this embodiment, a modified arrangement is provided for equalizing the pressures on the opposite sides of the valve member, a time interval after the pump is operated, so as to delay reopening of the valve member. In particular, the valve member 255 is made imperforate and sealed to the stem 256 so that no leakage of liquid occurs thereby when the pump is operating. Pressure equalization is effected by a conduit 271 having one end 271a communicating with the chamber at the underside of the piston 264 and the other end 271b communicating with the valve casing at the outlet side of the valve member 255.

When a leak occurs in the system, sufficient liquid will flow from the chamber to permit the piston 264 to move downwardly and close the valve member 255. When the pump 13 is thereafter operated, full pump discharge pressure will be applied to the upper side of the valve 255a while the lower side thereof is exposed to a relatively lower pressure. Fluid will flow through the passage 257a in the guide member 257 around the stem 256 and into the chamber at the underside of the piston to move the same upwardly against the bias of the springs 261 and 262. When the piston 264 reaches its uppermost position, the pressure in the chamber at the underside of the piston builds up to substantially pump discharge pressure and this pressure is communicated through conduit 271 to the underside of the valve member 255. The pressure in the line is then allowed to build up at the discharge side of the valve member and permit the spring 259 to open the same.

From the foregoing it is thought that the operation of the leak detectors will be readily understood. In general, the detectors are arranged to receive a charge of liquid from the pump, when the same is operated, and to deliver this charge of liquid back to the line after the pump is stopped. The volume of the charge is made greater than the normal thermal contraction of the liquid in the supply line so that, under normal operating conditions, the flow control members are not closed. However, if a leak occurs in the line, a greater volume will flow from the measuring chamber and permit the flow control members to close.

When the operator thereafter attempts to dispense gasoline, full flow through the line is prevented for a time interval after the pump is started. By suitable selection of the flow restrictions, this time interval can be made sufficiently long as to materially impede the operator in dispensing gasoline from the line, if a leak has occurred therein, so as to make it very inconvenient for the operator to disregard the presence of a leak for a prolonged period. However, it does permit the operator to dispense gasoline after a time delay, so as to preclude the necessity of completely shutting down the station as soon as the leak is detected.

We claim:

1. A liquid pumping system including a source of liquid supply, a remote delivery outlet, a supply line extending from said source to said outlet, a pump at said source, means including a selectively operable switch for controlling operation of said pump, a first valve means in said supply line adjacent said source, a second valve means in said supply line adjacent said outlet, means for closing said first and second valve means when said switch means is operated to stop said pump whereby to trap the liquid in the supply line between said first and second valve means, means communicating with said supply line between said first and second valve means and responsive to leakage of liquid from said line when said pump is stopped for interrupting delivery of liquid to the outlet the next time said switch is closed to operate the pump, said last mentioned means including time delay means operative a time interval after said switch is closed and the pump restarted for re-establishing flow through said line.

2. A liquid pumping system including a storage tank, a remote delivery outlet, a supply line extending from the tank to the outlet, a pump at said tank selectively operable to pump liquid from the tank into the supply line under pressure, a first valve means in the supply line adjacent said outlet, said first and second valve means being operative to close when said pump means is stopped to trap the liquid in the supply line therebetween, a chamber communicating with said supply line between said first and second valve means adapted to receive a charge of liquid when said pump is operated and to deliver the charge of liquid to the line when the pump is stopped to maintain the line full of liquid, the size of said chamber being correlated to the volume of said supply line between said first and second valve means to store a preselected volume of liquid in said chamber in excess of the thermal contraction of the liquid in the supply line with changes in ambient temperature, and leak indicating means responsive to the passage of said preselected volume from the chamber.

3. A liquid pumping system including a storage tank, a remote delivery outlet, a supply line extending from the tank to the outlet, a pump at said tank selectively operable to pump liquid from the tank into the supply line under pressure, a first valve means in the supply line adjacent said tank, a second valve means in said supply line adjacent said outlet, said first and second valve means being operative to close when said pump means is stopped to trap the liquid in the supply line therebetween, a chamber communicating with said supply line between said first and second valve means adapted to receive a charge of liquid when said pump is operated and to deliver the charge of liquid to the line when the pump is stopped to maintain the line filled with liquid, the size of said chamber being correlated to the volume of said supply line between said first and second valve means to store a preselected volume of liquid in said chamber in excess of the thermal contraction of the liquid in the supply line with changes in ambient temperature, and means responsive to the passage of said preselected volume from the chamber for interrupting delivery of liquid to said outlet.

4. A liquid pumping system including a storage tank, a remote delivery outlet, a supply line extending from the tank to the outlet, a pump at said tank selectively operable to pump liquid from the tank into the supply line under pressure, a first valve means in the supply line adjacent said tank, a second valve means in said supply line adjacent said outlet, said first and second valve means being operative to close when said pump means is stopped to trap the liquid in the supply line therebetween, a chamber communicating with said supply line between said first and second valve means adapted to receive a charge of liquid when said pump is operated, the size of said chamber being correlated to the volume of said supply line between said first and second valve means to store a preselected volume of liquid in said chamber in excess of the thermal contraction of the liquid in the supply line with changes in ambient temperature, flow control means actuatable to prevent full flow of liquid through said supply line when said pump is operated, means responsive to the passage of said predetermined volume from said chamber for actuating said flow control means, and means for restricting the rate of flow of liquid into said chamber when said flow control means is actuated.

5. A liquid pumping system including a storage tank, a remote delivery outlet, a supply line extending from the tank to the delivery outlet, a pump at said tank, means including a selectively actuatable control switch for controlling operation of said pump, a first valve means in said supply line adjacent said tank, a second valve means in said supply line adjacent said outlet, means for closing said first and second valve means when said pump is stopped to thereby trap the liquid in the supply line between said first and second valve means, a chamber communicating with said supply line between said first and second valve means and adapted to receive a charge of liquid when said pump is operated, flow control means actuatable to prevent full flow of liquid through said supply line when said pump is operated, and means operated in response to the passage of liquid from said chamber for actuating said flow control means.

6. A liquid pumping system including a storage tank, a remote delivery outlet, a supply line extending from the tank to the delivery outlet, a pump at said tank, means including a selectively actuatable control switch for controlling operation of said pump, a first valve means in said supply line adjacent said tank, a second valve means in said supply line adjacent said outlet, means for closing said first and second valve means when said pump is stopped to thereby trap the liquid in the supply line between said first and second valve means, a chamber communicating with said supply line between said first and second valve means and adapted to receive a charge of liquid when said pump is operated, flow control means actuatable to prevent full flow of liquid through said supply line when said pump is operated, means operated in response to the passage of liquid from said chamber for actuating said flow control means, and means for restricting the rate of flow of liquid into said chamber when said pump means is subsequently operated to delay re-establishing full flow through said line.

7. A liquid pumping system including a storage tank, a remote delivery outlet, a supply line extending from the tank to the delivery outlet, a pump at said tank, means including a selectively actuatable control switch for controlling operation of said pump, a first valve means in said supply line adjacent said tank, a second valve means in said supply line adjacent said outlet, means for closing said first and second valve means when said pump is stopped to thereby trap the liquid in the supply line between said first and second valve means, a chamber communicating with said supply line between said first and second valve means and adapted to receive a charge of liquid when said pump is operated, control valve means in said supply line adapted upon closing to prevent full flow therethrough, means operative in response to leakage of liquid out of said supply line between said first and second valve means for closing said control valve means, and time delay means operative a time interval after said pump is subsequently operated for re-opening said control valve means.

8. A liquid pumping system including a storage tank, a remote delivery outlet, a supply line extending from the tank to the delivery outlet, a pump at said tank, means including a selectively actuatable control switch for controlling operation of said pump, a first valve means in said supply line adjacent said tank, a second valve means in said supply line adjacent said outlet, means for closing said first and second valve means when said pump is stopped to thereby trap the liquid in the supply line between said first and second valve means, a chamber communicating with said supply line between said first and second valve means and adapted to receive a charge of liquid when said pump is operated, flow control means adapted when actuated to restrict the rate of flow of liquid through said line to a rate substantially less than normal flow therethrough, and means operated in response to the passage of liquid from said chamber for actuating said flow control means.

9. A pumping system including a storage tank, a remote delivery outlet, a supply line extending from the tank to the outlet, a pump at said tank selectively operable to pump liquid from the tank into the supply line under pressure, a first valve means in the supply line adjacent the tank, a second valve means in the supply line adjacent the outlet, means for closing said first and second valve means when said pump is stopped to trap the liquid in the supply line therebetween, a chamber having a movable wall therein and means yieldably urging said wall to an extended position, passage means communicating said chamber at one side of said wall with said supply line whereby liquid is delivered to said chamber when said pump is operated to move said wall to a retracted position and store a charge of liquid in said chamber under pressure, the volume displaced by said wall as it moves from a retracted to an extended position being greater than the normal contraction of liquid in the supply line between said first and second valve means with changes in ambient temperature, said movable wall being operative to maintain the liquid in the supply line under pressure when said pump is stopped, and leak indicating means responsive to movement of said wall to its extended position.

10. A pumping system including a storage tank, a remote delivery outlet, a supply line extending from the tank to the outlet, a pump at said tank selectively operabel to pump liquid from the tank into the supply line under pressure, a first valve means in the supply line adjacent the tank, a second valve means in the supply line adjacent the outlet, means for closing said first and second valve means when said pump is stopped to trap the liquid in the supply line therebetween, a chamber having a movable wall therein and means yieldably urging said wall to an extended position, passage means communicating said chamber at one side of said wall with said supply line whereby liquid is delivered to said chamber when said pump is operated to move said wall to a retracted position and store a charge of liquid in said chamber under pressure, the volume displaced by said wall as it moves from a retracted to an extended position being greater than the normal contraction of liquid in the supply line between said first and second valve means with changes in ambient temperature, said movable wall being operative to maintain the liquid in the supply line under pressure when said pump is stopped, flow control means adapted upon actuation to prevent full flow through said line, and means responsive to movement of said wall to its extended position for actuating said flow control means.

11. A pumping system including a storage tank, a remote delivery outlet, a supply line extending from the tank to the outlet, a pump at said tank selectively operable to pump liquid from the tank into the supply line under pressure, a first valve means in the supply line adjacent the tank, a second valve means in the supply line adjacent the outlet, means for closing said first and second valve means when said pump is stopped to trap the liquid in the supply line therebetween, a chamber having a movable wall therein and means yieldably urging said wall to an extended position, passage means communicating said chamber at one side of said wall with said supply line whereby liquid is delivered to said chamber when said pump is operated to move said wall to a retracted position and store a charge of liquid in said chamber under pressure, the volume displaced by said wall as it moves from a retracted to an extended position being greater than the normal contraction of liquid in the supply line between said first and second valve means with changes in ambient temperature, said movable wall being operative to maintain the liquid in the supply line under pressure when said pump is stopped, a flow control valve in said supply line, means for normally maintaining said control valve in its open position, and means responsive to movement of said wall to its extended position for closing said valve.

12. The combination of claim 11 wherein said passage means is restricted to regulate the flow of liquid into said chamber when said pump is operated and thereby delay reopening of said valve.

13. In combination with a pumping system including a supply line through which liquid is intermittently pumped, spaced valve means in the line operative to close when the pump is stopped to isolate a section of the line from the system, an apparatus for detecting a leak in the section of the line between said spaced valve means comprising, a chamber having a movable wall therein and means yieldably urging said wall to an extended position, passage means communicating said chamber at one side of said wall with said section of the line whereby liquid is delivered to said chamber when said pump is operated to move said wall to a retracted position and store a charge of liquid in said chamber under pressure, the volume displaced by said wall as it moves from a retracted to an extended position being greater than the normal contraction of liquid in said section of the line between said first and second valve means with changes in ambient temperature, said movable wall being operative to maintain the liquid in said section of the line under pressure when said pump is stopped, a flow control valve in said section of the supply line, spring means yieldably urging said control valve to its open position, and means on said control valve engageable with said wall for closing said control valve when the wall reaches its extended position.

14. The combination of claim 13 wherein said control valve is movable to its closed position in the direction of flow of liquid from the pump to the pedestal whereby the liquid delivered from the pump under pressure tends to maintain said control valve in its closed position.

15. The combination of claim 14 including passage means for slowly equalizing the pressures on opposite sides of the control valve.

16. In combination with a pumping system including a supply line through which liquid is intermittently pumped; spaced valve means in the line operative to close when the pump is stopped to isolate a section of the supply line from the remainder of the system, an apparatus for detecting a leak in the section of the line between said spaced valve means comprising, a chamber having a movable wall therein and means yieldably urging said wall to an extended position, passage means communicating said chamber at one side of said wall with said section of the supply line whereby liquid is delivered to said chamber when said pump is operated to move said wall to a retracted position and store a charge of liquid in said chamber under pressure, the volume displaced by said wall as it moves from a retracted to an extended position being greater than the normal contraction of liquid in said section of the supply line between said first and second valve means with changes in ambient temperature, said movable wall being operative to maintain the liquid in the supply line under pressure when said pump is stopped, a flow control valve in said supply line, latch means engageable with said control valve for releasably retaining said valve in its open position, and means responsive to movement of said wall to an extended position for releasing said latch means and permit closing of said control valve.

17. The combination of claim 16 including means on said wall engageable with said control valve for opening said control valve as said wall moves to its retracted position.

18. The combination of claim 17 wherein said passage means is restricted to retard movement of said wall to its retracted position and thereby delay reopening of said valve.

19. The combination of claim 18 including means for passing a restricted flow of liquid past said control valve when the latter is closed.

References Cited in the file of this patent

UNITED STATES PATENTS

| | | |
|---|---|---|
| 1,631,454 | Bambach et al. | June 7, 1927 |
| 2,013,431 | Bechtold | Sept. 3, 1935 |